US008132558B2

(12) United States Patent
Lucas et al.

(10) Patent No.: US 8,132,558 B2

(45) Date of Patent: Mar. 13, 2012

(54) COMMON RAIL FUEL PUMP WITH COMBINED DISCHARGE AND OVERPRESSURE RELIEF VALVES

(75) Inventors: Robert G. Lucas, Ellington, CT (US); Ilija Djordjevic, East Granby, CT (US)

(73) Assignee: Stanadyne Corporation, Windsor, CT (US)

( * ) Notice: Subject to any disclaimer, the term of this patent is extended or adjusted under 35 U.S.C. 154(b) by 293 days.

(21) Appl. No.: 12/592,673

(22) Filed: Dec. 1, 2009

(65) Prior Publication Data

US 2011/0126804 A1 Jun. 2, 2011

(51) Int. Cl.
*F02M 37/00* (2006.01)
*F16K 17/26* (2006.01)

(52) U.S. Cl. ..................... 123/510; 137/493.9; 137/512; 137/505.11

(58) Field of Classification Search .................. 123/446, 123/447, 456, 457, 467, 510, 511; 137/493, 137/493.3, 493.6, 493.8, 493.9, 512, 512.1, 137/515.5, 516.25, 505.11

See application file for complete search history.

(56) References Cited

U.S. PATENT DOCUMENTS 3,765,445 A * 10/1973 Schultz .......................... 137/493
3,896,845 A * 7/1975 Parker ......................... 137/493.3
3,939,866 A * 2/1976 Pignatelli ................... 137/493.4
3,976,096 A * 8/1976 Kass et al. ................. 137/493.2
4,577,606 A * 3/1986 Bohringer et al. ............ 123/506
4,648,369 A * 3/1987 Wannenwetsch ............. 123/467
4,651,779 A * 3/1987 Filippi et al. ............... 137/493.3
4,729,401 A * 3/1988 Raines .......................... 137/512
4,834,134 A * 5/1989 Asami et al. ............... 137/493.3
4,840,160 A * 6/1989 Zipprath et al. .............. 123/467
4,923,602 A * 5/1990 Blood ........................... 210/117
4,926,902 A * 5/1990 Nakamura et al. ......... 137/493.3
5,036,877 A * 8/1991 Distler et al. ................. 137/489
5,072,752 A * 12/1991 Kolchinsky ................... 137/493
5,143,115 A * 9/1992 Geyler, Jr. ...................... 137/493
5,183,075 A * 2/1993 Stein .......................... 137/493.6

(Continued)

FOREIGN PATENT DOCUMENTS

DE 31 49 032 A1 6/1983

(Continued)

OTHER PUBLICATIONS

International Search Report PCT/US2010/002978, dated Apr. 15, 2011.

*Primary Examiner* — Thomas Moulis

(74) *Attorney, Agent, or Firm* — Alix, Yale & Ristas, LLP

(57) ABSTRACT

A high pressure piston fuel pump having a discharge check valve between the pumping chamber and a pressurized fuel reservoir and a pressure relief valve between the fuel reservoir and a passageway in the housing, wherein the discharge check valve and the pressure relief valve are contained within a single fitting assembly affixed at the pump housing. A first end flow passage is in fluid communication with the pumping chamber and provides an inlet to the discharge check valve and an outlet from the pressure relief valve. A second end flow passage is in fluid communication with the fuel reservoir and provides an outlet for the discharge check valve and an inlet for the pressure relief valve. Advantages include the ability to pre-test the outlet check and pressure relief prior to assembly into the pump housing, and improved flexibility of the outlet fitting location.

20 Claims, 4 Drawing Sheets

U.S. PATENT DOCUMENTS

| | | | | |
|---|---|---|---|---|
| 5,477,829 | A * | 12/1995 | Hassinger et al. | 123/467 |
| 5,839,414 | A * | 11/1998 | Klinger et al. | 123/467 |
| 6,283,094 | B1 | 9/2001 | Ogata | 123/467 |
| 6,352,067 | B1 * | 3/2002 | Genslak | 123/510 |
| 7,007,708 | B2 * | 3/2006 | Burke et al. | 137/12 |
| 7,086,388 | B2 * | 8/2006 | Roth et al. | 123/510 |
| 7,086,413 | B2 * | 8/2006 | Yu et al. | 137/493.9 |
| 7,096,883 | B2 * | 8/2006 | Gessat et al. | 137/493.8 |
| 7,401,623 | B2 * | 7/2008 | Roe et al. | 137/493.9 |
| 2001/0032675 | A1 * | 10/2001 | Russell | 137/493.9 |
| 2003/0111115 | A1 * | 6/2003 | Schultz et al. | 137/493.9 |
| 2006/0231078 | A1 * | 10/2006 | Barylski et al. | 123/511 |
| 2009/0151700 | A1 * | 6/2009 | Kondoh | 123/457 |

FOREIGN PATENT DOCUMENTS

| | | | |
|---|---|---|---|
| EP | 1 411 238 | A1 | 4/2004 |
| GB | 2 058 948 | A | 4/1981 |
| GB | 2 267 320 | A | 12/1993 |
| GB | 2 269 209 | A | 2/1994 |

* cited by examiner

COMMON RAIL FUEL PUMP WITH COMBINED DISCHARGE AND OVERPRESSURE RELIEF VALVES

BACKGROUND

The present invention relates to high pressure fuel supply pumps for gasoline common rail injection systems.

Single piston, cam driven high pressure fuel pumps have become a common solution for generating high pressure fuel in common rail direct injection gasoline engines. It is known in the industry that the pump must incorporate an outlet check valve to prevent pressure bleed back from the rail while the pump is in the intake stroke cycle. It has become an industry requirement to incorporate a pressure relief valve within the pump to protect the entire high pressure system from an unexpected excess pressure caused by a system malfunction. In order to protect the rail and injectors, the pressure relief valve must be in hydraulic communication with the rail, i.e., in parallel with the pump flow. In order to make the parallel hydraulic communication, typical executions have located the outlet check valve and pressure relief valve as separate devices within the pump housing.

SUMMARY OF THE INVENTION

The conventional configuration of separate outlet check valve and pressure relief valve within the housing suffers from several disadvantages including high cost, difficulty in pre-testing the sub-assembly, and restrictions on the radial location of the outlet fitting. These disadvantages are overcome with the present invention.

According to an aspect of the present invention, the outlet check valve and the pressure relief valve are contained within a single fitting of the high pressure fuel pump. The advantages include lower system cost, ability to pre-test the function of the outlet check and pressure relief valve prior to assembly into the pump housing, and improved flexibility of outlet fitting radial location.

The disclosed embodiment is directed to a high pressure single piston fuel pump in which a fitting at the housing has flow passages at opposite ends, wherein a first end flow passage is in fluid communication with the pumping chamber and provides an inlet to the discharge check valve and an outlet from the pressure relief valve, and a second end flow passage is in fluid communication with the fuel reservoir and provides an outlet for the discharge check valve and an inlet for the pressure relief valve. Preferably, the fitting assembly is bounded by a cylindrical body having a central bore and a valve seat member is fixed within the bore such the corresponding two valve seats area coaxially aligned.

The seat member has a first internal flow path for discharge flow between the first and second end passages and a distinct second internal flow path for pressure relief flow between the second and the first end passages. A first valve and first valve spring are operatively associated with the first internal flow path and a second valve and second valve spring are operatively associated with the second internal flow path. The first valve is biased with a force corresponding to the fuel discharge opening pressure and the second valve is biased with a force corresponding to the overpressure relief opening pressure.

In one embodiment the valve seat member is substantially centrally fixed within the fitting, having a first flow path obliquely oriented from the bore diameter to a first seat at the axis for discharge flow between the first and second end passages and a second flow path obliquely oriented from the bore diameter to a second seat at the axis for pressure relief flow between the second and the first end passages.

In another embodiment, the first flow path through the seat member is substantially parallel to the bore axis and the second flow path through the seat member is substantially radial.

In another aspect, the invention is directed to the fitting assembly itself, comprising a cylindrical body having a through bore with first and second ends, a valve seat member fixed in the bore and having a first internal flow path operatively associated with a first check valve for controlling flow from the first end to the second end and a second internal flow path operatively associated with a second, coaxially aligned check valve for controlling flow from the second end to the first end.

All flow in each direction is contained within the body, and passes through the same flow passages at both ends of the body.

DESCRIPTION OF THE PREFERRED EMBODIMENTS

Figure 1A:
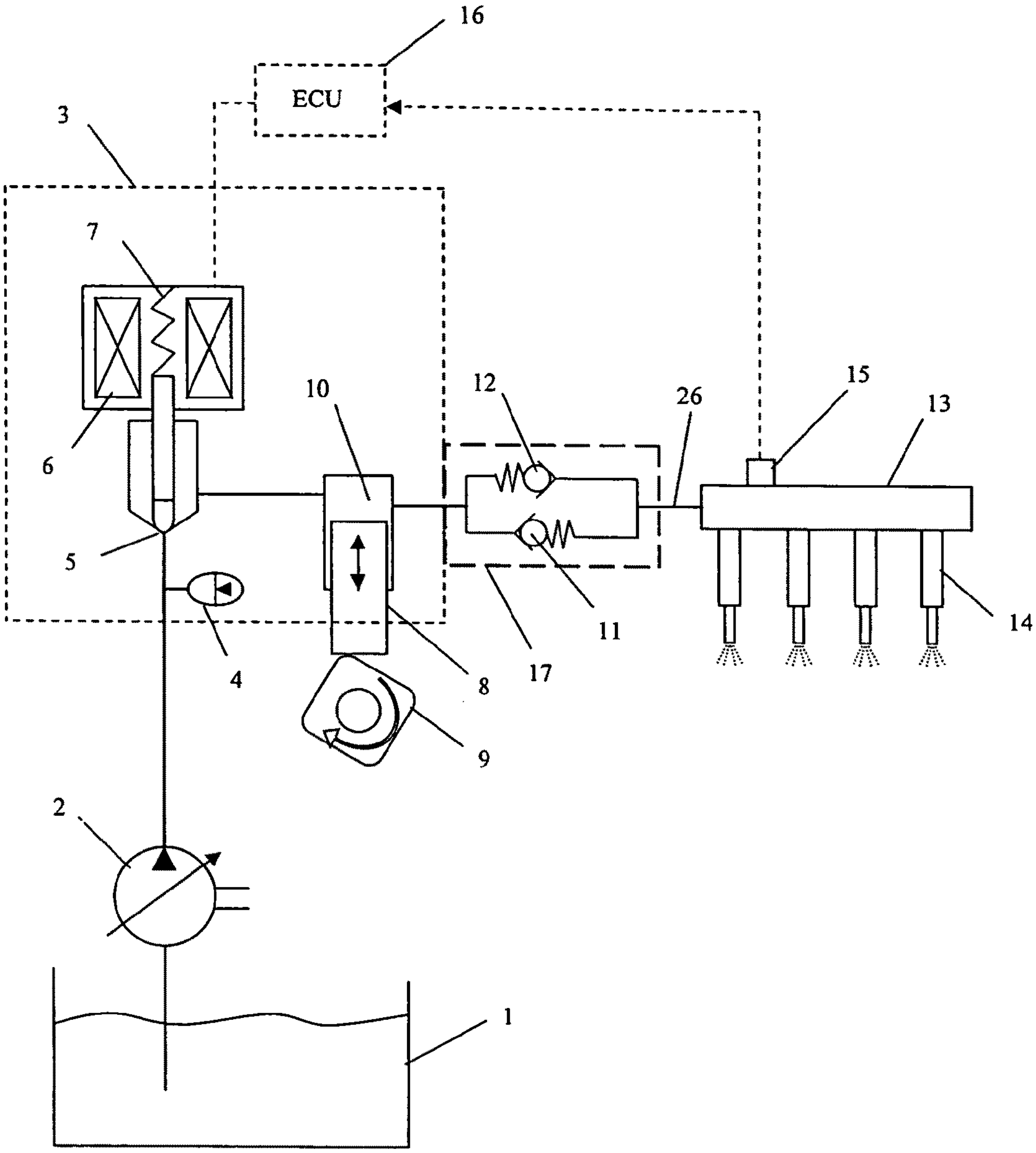
FIGS. 1A and 1B are schematics of a common rail fuel system for an internal combustion engine, showing two possible locations for the double valve fitting assembly of the present invention.
Figure 1B:
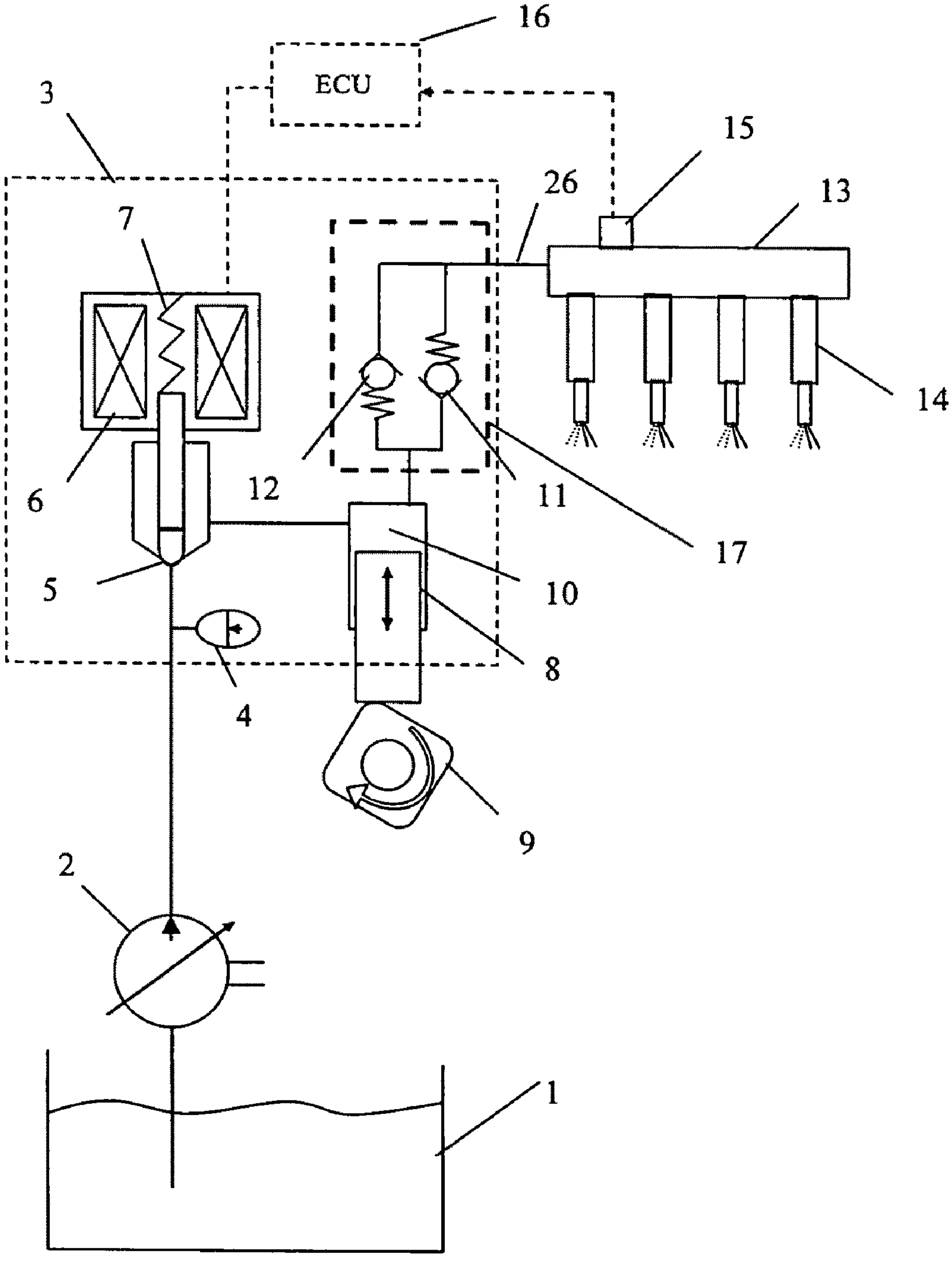

As represented in FIGS. 1A and 1B (collectively FIG. 1), a low-pressure pump 2 pressurizes fuel from the fuel tank 1, and delivers it to the high pressure pump housing 3 through an inlet fitting. The fuel passes under the influence of an accumulator 4 to a normally closed control valve 5. A normally open control valve is also applicable to such a fuel system. The fuel is drawn into the pumping chamber 10, where it is pressurized by the upward motion of the pumping piston 8 via the engine camshaft 9. The control valve 5 is acted upon by the control valve spring 7 and solenoid 6 to control the quantity of fuel delivered by the high pressure pump. This is accomplished by the accurate timing of the control valve closing relative to the pumping piston upward travel position. When the fuel is pressurized in pumping chamber 10, it travels through the outlet check valve 11, high pressure line 26, and into the common rail 13 that feeds the engine fuel injectors 14. Because the injectors 14 are fed from a pressurized common rail reservoir 13, injector timing is flexible. Desired rail pressure is controlled by a closed feedback loop in the Electronic Control Unit (ECU) 16 including control of the high pressure fuel output via the solenoid 6 and control valve 5 compared to the rail pressure sensor 15 output signal to the ECU 16. A pressure relief valve 12 is required to protect the high pressure system in case of a system malfunction. It can also be used to control the maximum system pressure to a predefined limit to protect other fuel system components. According to the invention, valves 11 and 12 are contained within a single outlet fitting assembly 17.

Figure 2:
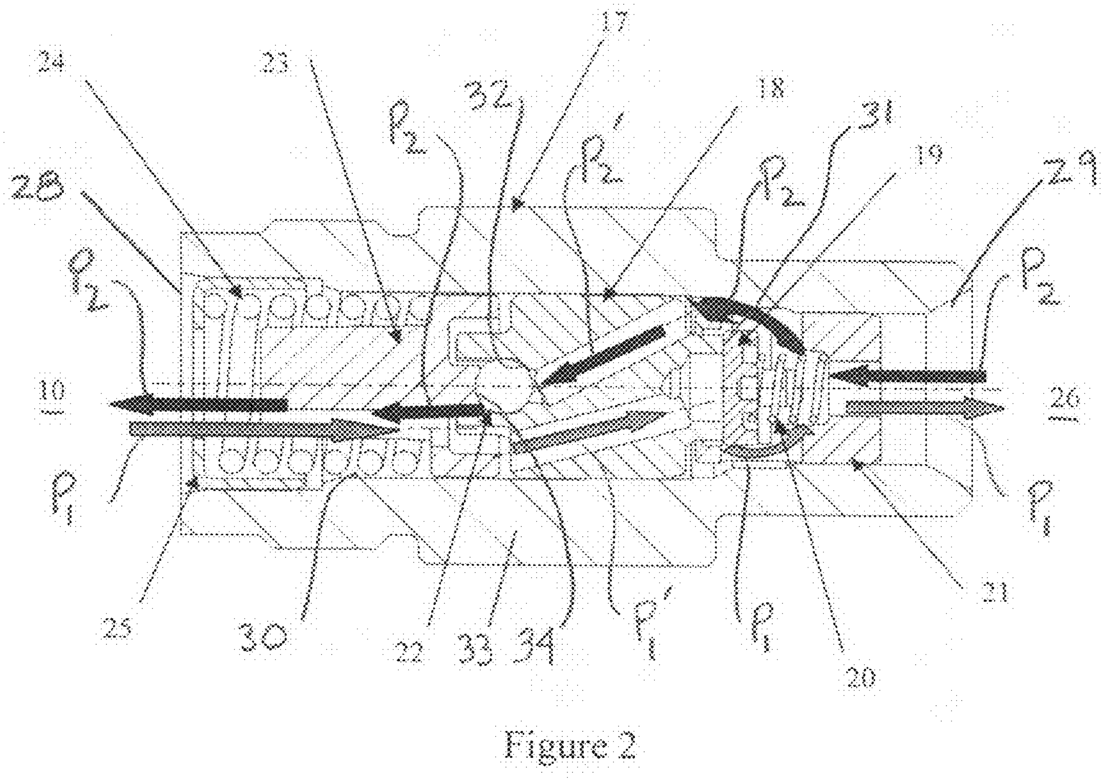
FIG. 2 is a longitudinal section view of an outlet fitting assembly that incorporates the outlet check valve and pressure relief valve into a single sub-assembly according to an aspect of the present invention.

FIG. 2 shows one embodiment of an outlet fitting assembly 17 for a single piston high pressure fuel pump that incorporates items 11 (outlet check valve) and 12 (pressure relief valve) of FIG. 1 into a single component that can be tested for function prior to assembly into a pump housing. The outlet fitting assembly is in hydraulic communication with the pumping chamber 10 on one end, and high pressure line 26 on the other end. The fitting assembly has a generally cylindrical body 33 having a through bore with varying diameter that defines a longitudinal flow axis (indicated by the dashed line). The outlet/pressure relief valve seat member 18 is affixed and sealed to the bore wall of body 33 by an interference fit. The outlet check valve 19 is biased closed against valve seat member 18 by the outlet check spring 20, and guided by the outlet check stop 21. The pressure relief ball 22 is guided in and seals against seat member 18. The ball 22 is biased closed by the pressure relief spring 24 through the spring seat 23. Item 25 is an adjustment cup that is interference fitted into the bore wall, bearing against spring 24 until the desired opening pressure of ball 22 is reached.

During normal pump operation, the fuel flow follows the arrow path P1 during the pumping phase of the operational cycle. During the charging phase, the outlet check valve 19 closes, preventing any backflow through the fitting into the pumping chamber 10. If a pressure above the set point of the pressure relief ball 22 is reached during the charging phase, the ball will open, allowing backflow to follow the arrow path P2, and into the pumping chamber 10.

Figure 3:
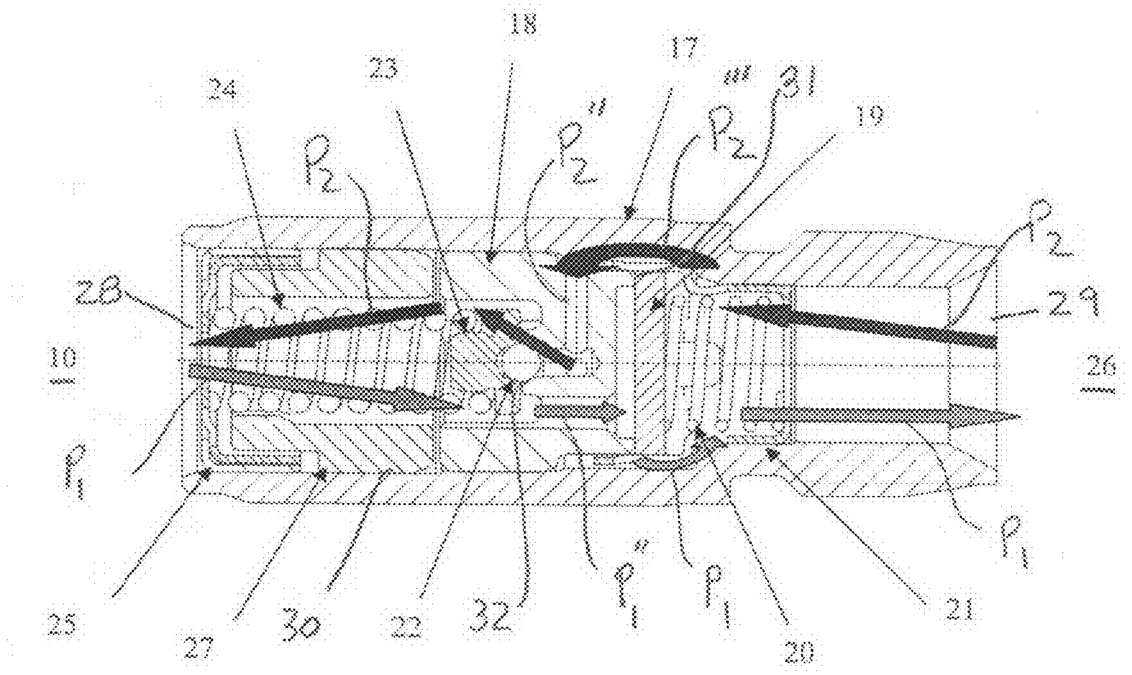
FIG. 3 is a longitudinal section view of an alternative embodiment of the invention.

FIG. 3 depicts another embodiment of the present invention. Although the components are visually different, the function is the same as in FIG. 2, and the component numbers have been labeled the same. The only exception is item 27, which is a spring guide for item 24, and also acts to fill fluid volume to improve pump efficiency (less compressible than fuel).

It can thus be appreciated that in both embodiments the first, discharge check valve 19 and the second, pressure relief valve 22 are contained within the through bore of a single fitting assembly 17 on (FIG. 1A) or in (FIG. 1B) the pump housing 3, having flow passages at opposite ends. The through bore 30 of varying diameter defines the ends 28, 29 of the first and second flow passages P1, P2, along the longitudinal axis. The first end 28 of flow passage P1 is in fluid communication with the pumping chamber 10 and provides an inlet to the discharge check valve 19 and an outlet from the pressure relief valve 22, and the second end 29 of flow passage P2 is in fluid communication with the fuel reservoir 13 and provides an outlet for the discharge check valve 19 and an inlet for the pressure relief valve 22.

The unitary valve seat member 18 is substantially centrally fixed within the fitting assembly 17, having a first internal flow path P1', P1" to a first seat facing the second end 29, for discharge flow between the first and second end passages 28, 29 and a second internal flow path P2', P2" to a second seat facing the first end 28, for pressure relief flow between the second and the first end passages 29, 28. A first valve element 19 is biased against the first seat with a force corresponding to the fuel discharge opening pressure and a second valve element 22 is biased against the second seat with a force corresponding to the overpressure relief opening pressure.

In the embodiment of FIG. 2, the valve seat member 18 is substantially centrally fixed within the fitting, having a portion of the first flow path P1' obliquely oriented from the bore diameter to the first seat surface 31 of seat member 18 at the axis for discharge flow between the first and second end passages and a portion P2' of the second flow path obliquely oriented from the bore diameter to the second seat surface 32 of seat 18 at the axis for pressure relief flow between the second and the first end passages. The first valve element 19 is biased against the first seat surface 31 with a force corresponding to the fuel discharge opening pressure and the second valve element 22 is biased against the second seat surface 32 with a force corresponding to the overpressure relief opening pressure.

The first flow path P1' enlarges at the axis to a cylinder 31 and the first valve element 19 is a flat plate with a sealing face biased by the spring 20 against the cylinder. The second flow path P2' enlarges with a taper at the axis and the second valve element 22 is a ball biased against the tapered surface.

Preferably, the first valve element 19 is biased by a coil spring 20 interposed between the first valve element 19 and a first stopper 21 fixed in the bore adjacent the second end 29 of the flow passage, and the second valve element 22 is biased by a second coil spring 24 interposed between the second valve element and a second stopper 25 fixed in the bore adjacent the first end 28 of the flow passage. The first coil spring 20 seats in the first valve element 19 on a side of the plate opposite the sealing face and the second coil spring 24 seats over an axially slidable spring seat 23 having a nose 34 bearing on the ball valve element 22.

As in the embodiment of FIG. 2, the embodiment of FIG. 3 has the first valve element 19 and first valve spring 20 operatively associated with the first internal flow path P1" and the second valve element 22 and second valve spring 24 operatively associated with the second internal flow path P2". Here, the flow path portion P1" through seat member 18 is parallel to the axis of the fitting whereas the flow path portion P2" through seat member 18 is substantially radial. When valve element 19 is closed against seat 31, there is sufficient radial clearance between the circumference of valve element 19 and the inside diameter of the wall of the body to provide for flow along path portion P2'" when overpressure is to be relieved.

In general function, the combination valve assembly could be mounted anywhere between the pumping chamber and common rail, but as a practical matter it should be close enough to the pumping chamber to avoid pumping chamber dead volume, which results in poor efficiency. To achieve many of the advantages discussed in the Summary, the pump embodiment has the valve arrangement within the fitting, and the fitting assembly is preferably affixed at the pump housing. In this context, "affixed at the housing" should be understood as encompassing "affixed to" and "affixed on" the housing. The fitting assembly and check valves can protrude into the confines of the pump housing.

It can be appreciated that in the preferred embodiments, (1) all the flow paths and valves for both functions are entirely within a single bore in a solid body, (2) all the flow in each direction passes through the same unitary valve seat member, which is substantially centrally located in the bore and has distinct coaxial valve seats, and (3) all the flow in each direction passes through the same coaxial, substantially cylindrical flow passages on either axial side of the valve seat member. This combination of features facilities simple testing of both valves before installation at the pump, with only two test connections (i.e., one at each end of the body).

The invention claimed is:

1. A high pressure single piston fuel pump having a housing, a pumping chamber within the housing, a piston with one end in the pumping chamber and another end outside the housing, which piston reciprocates between a retracting motion during which fuel is delivered to the pumping chamber and a pumping motion during which the piston pressurizes fuel in the pumping chamber, a discharge check valve between the pumping chamber and a pressurized common rail fuel reservoir, and a pressure relief valve between the common rail fuel reservoir and the pumping chamber, wherein:

the discharge check valve and the pressure relief valve are contained within a single fitting assembly affixed at the housing;

the fitting assembly extends longitudinally along a flow axis, having coaxially aligned first and second flow passages at respective first and second ends of the fitting assembly;

the first flow passage is in fluid communication with the pumping chamber and provides an inlet to the discharge check valve and an outlet from the pressure relief valve;

the second flow passage is in fluid communication with the common rail fuel reservoir and provides an outlet from the discharge check valve and an inlet to the pressure relief valve; and a unitary valve seat member is situated within the fitting assembly between the first and second flow passages, having a first valve seat for the check valve coaxially aligned with a distinct second valve seat for the pressure relief valve.

2. The pump of claim 1, wherein the fitting assembly has a solid body with a through bore of varying diameter defining the first and second flow passages;

the valve seat member is substantially centrally fixed within the body, having a first flow path obliquely oriented from a bore wall to the first seat at the axis for discharge flow between the first and second flow passages and a second flow path obliquely oriented from a bore wall to the second seat at the axis for pressure relief flow between the second and first flow passages; and a first valve element is biased against the first seat with a force corresponding to the fuel discharge opening pressure and a second valve element is biased against the second seat with a force corresponding to the overpressure relief opening pressure.

3. The pump of claim 2, wherein the first flow path enlarges at the axis to a cylinder and the first valve element is a flat plate with a sealing face biased against the cylinder; and the second flow path enlarges with a taper at the axis and the second valve element is a ball biased against the tapered surface.

4. The pump of claim 3, wherein the first valve element is biased by a first coil spring interposed between the first valve element and a first stopper fixed in the bore adjacent the second flow passage; and the second valve element is biased by a second coil spring interposed between the second valve element and a second stopper fixed in the bore adjacent the first flow passage.

5. The pump of claim 4, wherein the first coil spring seats in the first valve on a side of the plate opposite the sealing face and the second coil seats in an axially slidable spring seat having a nose bearing on the ball.

6. The pump of claim 1, wherein the fitting assembly has solid body with a through bore of varying diameter defining the first and second flow passages;

the valve seat member is substantially centrally fixed within the bore, having a first internal flow path to the first seat facing the second end, for discharge flow between the first and second passages and a second internal flow path to the second seat facing the first end, for pressure relief flow between the second and the first passages; and a first valve element is biased against the first seat with a force corresponding to the fuel discharge opening pressure and a second valve element is biased against the second seat with a force corresponding to the overpressure relief opening pressure.

7. The pump of claim 6, wherein the first flow path enlarges to a cylinder and the first valve element is a flat plate with a sealing face biased against the cylinder; and the second flow path enlarges with a taper and the second valve element is a ball biased against the tapered surface.

8. The pump of claim 7, wherein the first valve element is biased by a first coil spring interposed between the first valve element and a first stopper fixed in the bore adjacent the second flow passage; and the second valve element is biased by a second coil spring interposed between the second valve element and a second stopper fixed in the bore adjacent the first flow passage.

9. The pump of claim 8, wherein the first coil spring seats in the first valve on a side of the plate opposite the sealing face and the second coil seats in an axially slidable spring seat bearing on the ball.

10. The pump of claim 1, wherein the fitting assembly has solid body with a central through bore;

the valve seat member has a first internal flow path for discharge flow between the first and second passages and a distinct second internal flow path for pressure relief flow between the second and first flow; and a first valve element and first valve spring are operatively associated with the first internal flow path and a second valve element and second valve spring are operatively associated with the second internal flow path, said first valve element biased with a force corresponding to the fuel discharge opening pressure and said second valve element biased with a force corresponding to the overpressure relief opening pressure.

11. The pump of claim 1, wherein the fitting assembly has a through bore;

said valve seat member is fixed within the bore with the first seat facing the second end, and the second seat facing the first end;

a first valve element is biased against the first seat with a force corresponding to the fuel discharge opening pressure and a second valve element is biased against the second seat with a force corresponding to the overpressure relief opening pressure;

the flow passages on either axial side of the valve seat member are substantially cylindrical and coaxial; and in use, all the flow in each direction passes through the same substantially cylindrical flow passages on either axial side of the valve seat member.

12. The pump of claim 10 wherein an internal flow path portion through said seat member is parallel to the axis and another internal flow path portion through said seat member is substantially radial;

the flow passages on either axial side of the valve seat member are substantially cylindrical and coaxial; and in use, all the flow in each direction passes through the same substantially cylindrical flow passages on either axial side of the valve seat member.

13. The pump of claim 12, wherein the parallel flow path portion defines flow toward the first valve element and when the first valve element is closed there is sufficient radial clearance between the first valve element and the bore wall to provide fluid communication with the radial flow portion to the second valve.

14. A two way valve fitting assembly comprising:

a substantially cylindrical solid body having a through bore defining a longitudinal axis and first and second ends;

a valve seat member fixed in the bore between the ends and having a first internal flow path operatively associated with a first check valve for controlling flow from the first end to the second end and a second internal flow path operatively associated with a second check valve for controlling flow from the second end to the first end;

wherein said check valves are coaxially aligned.

15. The fitting assembly of claim 14, wherein the valve seat member is substantially centrally fixed within the bore, between coaxially aligned first and second cylindrical end passages at respective first and second ends of the bore;

the first flow path has a portion obliquely oriented from the bore wall to a first seat at the axis for flow control between the first and second end passages and the second flow path has a portion obliquely oriented from the bore wall to a second seat at the axis for flow control between the second and the first end passages; and in use, all flow through the first flow path passes through the first and second end passages and all flow through the second flow path passes through the second and first end passages.

16. The fitting assembly of claim 15, wherein the first flow path enlarges to a cylinder;

the first valve includes a flat plate with a sealing face biased against the cylinder; and the second flow path enlarges with a taper and the second valve includes a ball biased against the tapered surface.

17. The fitting assembly of claim 16, wherein the plate is biased by a first coil spring interposed between the plate and a first stopper fixed in the bore adjacent the second end passage; and the ball is biased by a second coil spring interposed between the ball and a second stopper fixed in the bore adjacent the first end passage.

18. The fitting assembly of claim 17, wherein the first coil spring seats in the first valve on a side of the plate opposite the sealing face and the second coil seats in an axially slidable spring seat bearing on the ball.

19. The fitting assembly of claim 14 wherein an internal flow path portion through said seat member is parallel to the axis of the fitting and another internal flow path portion through said seat member is substantially radial.

20. The fitting assembly of claim 19, wherein the parallel flow path portion flows toward the first valve and when the first valve is closed there is sufficient radial clearance between the first valve and the bore wall to provide fluid communication with the radial flow portion to the second valve.

* * * * *